United States Patent [19]

Mabuchi et al.

[11] Patent Number: 5,405,199
[45] Date of Patent: Apr. 11, 1995

[54] BEARING DEVICE FOR MINIATURE MOTORS

[75] Inventors: Kazuichi Mabuchi; Yoshiaki Egawa; Makoto Satou, all of Matsudo, Japan

[73] Assignee: Mabuchi Motor Co., Ltd., Chiba, Japan

[21] Appl. No.: 983,832

[22] Filed: Dec. 1, 1992

[30] Foreign Application Priority Data

Dec. 3, 1991 [JP] Japan ................... 3-318909

[51] Int. Cl.⁶ .................... F16C 23/04; F16C 11/06
[52] U.S. Cl. ............................ 384/204; 310/90; 384/206; 403/140
[58] Field of Search ............... 384/192, 202, 203, 204, 384/206, 208; 403/122, 133, 135, 140; 310/90, 40 MM, 43, 45

[56] References Cited

U.S. PATENT DOCUMENTS

| 4,511,277 | 4/1985 | McCabe | 384/203 X |
| 4,564,307 | 1/1986 | Ito | 403/140 |
| 4,591,276 | 5/1986 | Schneider et al. | 384/203 X |
| 4,615,638 | 10/1986 | Ito | 384/203 X |

FOREIGN PATENT DOCUMENTS

| 55-23214 | 6/1980 | Japan . | |
| 56-32657 | 8/1981 | Japan . | |
| 2151413 | 7/1985 | Japan | 310/40 MM |
| 63-1576 | 1/1988 | Japan . | |
| 1585337 | 2/1981 | United Kingdom . | |

*Primary Examiner*—Daniel P. Stodola
*Attorney, Agent, or Firm*—McGlew and Tuttle

[57] ABSTRACT

A bearing device for miniature motors comprising a stator formed by fitting an end plate to an open end of a housing formed into a bottomed hollow cylindrical shape. A rotor rotatably supported by bearings is provided on the housing and the end plate. A bearing retaining body is provided formed of a resin material into a basket shape. The bearing retaining body has such a construction that a flange and a bottom member, both formed into a ring shape, are connected by a plurality of axially extending and circumferentially disposed connecting members. A plurality of axially extending support columns are disposed in the circumferential direction on the inner edge surface of the bottom member. The bearing retaining body is fitted to a retaining part provided on the housing and/or the end plate, and a ball bearing is supported via the supporting claims.

8 Claims, 3 Drawing Sheets

BEARING DEVICE FOR MINIATURE MOTORS

BACKGROUND OF THE INVENTION

This invention relates generally to a bearing device for miniature motors used for automotive door-window actuators and other equipment, and more particularly to a bearing device for miniature motors in which improvement has been made on the bearing retaining body of self-aligning ball bearings.

DESCRIPTION OF THE PRIOR ART

FIG. 1 is a longitudinal sectional front view illustrating the essential part of a miniature motor to which this invention is applied. In FIG. 1, numeral 1 refers to a housing formed of a metallic material, such as mild steel, into a bottomed hollow cylindrical shape, and having an arc-segment-shaped permanent magnet 2 on the inner circumferential surface thereof. In the housing 1 there is housed a rotor 5 consisting of an armature 3 facing the permanent magnet 2 and a commutator 4. Numeral 6 refers to an end plate made of the same metallic material as that of the housing 1, and fitted to the open end of the housing 1. Numeral 7 refers to brush arms provided in such a manner as to make sliding contact with the commutator 4, and provided on the end plate 6, together with input terminals 8 electrically connected to the brush arms 7. The brush arms 7 and the input terminals 8 are adapted to be electrically insulated from the end plate 6. Numerals 9 and 10 refer to bearings fitted into bearing retaining parts 11 and 12 provided by embossing the housing 1 and the end plate 6.

With the aforementioned construction, as power is fed from the input terminals 8 to the armature 3 via the brush arms 7 and the commutator 4 constituting the rotor 5, rotating force is imparted to the armature 3 existing in a magnetic field produced by the permanent magnet 2 fixedly fitted to the inner circumferential surface of the housing 1, causing the rotor 5 to rotate, driving external equipment (not shown) via a shaft 13.

FIGS. 2 and 3 are a longitudinal sectional view and a partially cross-sectional plan view illustrating the neighborhood of the bearing retaining part 11 shown in FIG. 1. Like parts are indicated by like reference numerals shown in FIG. 1. In FIGS. 2 and 3, numeral 14 refers to a bearing retaining body comprising an inner cylindrical member 15, outer cylindrical member 16, and bridging pieces 17 bridging these inner and outer cylindrical members 15 and 16. The inside surface of the inner cylindrical member 15 is formed into a spherical surface to accommodate the bearing 9 the outer circumferential surface of which is also formed into a spherical surface. Three stopper parts 18 are provided on the upper end of the inner cylindrical member 15. The bridging pieces 17 connect the inner and outer cylindrical members 15 and 16 in the tangential direction. The bearing retaining body 14 is made of polyacetal resin, for example, and other resin materials having high abrasion resistance, and the outside diameter thereof is formed into less than 10 mm, the thickness of the side walls of the inner and outer cylindrical members 15 and 16 thereof into less than 1 mm, and the axial height thereof into less than 5 mm.

When the bearing retaining body 14 is press-fitted into the retaining part 19 provided on the housing 1, the outer cylindrical member 16 is elastically deformed temporarily, but the bearing retaining body 14 is held in the retaining part 19 by the restoring force of the outer cylindrical member 16. Next, when the bearing 9 is press-fitted into the inner cylindrical member 15 of the bearing retaining body 14, the periphery of the open end of the inner cylindrical member 15 is slightly elongated, but the bearing 9 is held in place by the restoring force of the inner cylindrical member 15, and the axial movement of the bearing 9 is restricted by the stopper parts 18. With the aforementioned construction, the bearing 9 is allowed to rotate with the inner cylindrical member 15, performing self-aligning function.

The bearing retaining body 14 having the aforementioned construction is usually manufactured by injection molding means using molding dies, for example. That is, a stationary mold having a cavity corresponding to the outer profile of the outer cylindrical member 16 is mated with a movable die having a cavity corresponding to the inner profile of the outer cylindrical member 16 and the inner and outer profiles of the inner cylindrical member 15, and thermoplastic resin is poured into the cavity formed. After it is allowed to cool to a predetermined temperature, the movable die is moved in the axial direction, then the formed bearing retaining body 14 is moved as it adheres to the movable die. To extract the bearing retaining body 14 from the die, a movable core having a crescent-shaped cross section corresponding to a gap between the inner cylindrical member 15 and the outer cylindrical member 16 is pulled out in the axial direction, and then the bearing retaining body 14 can be extracted in the axial direction. At this moment, the periphery of the open end of the inner cylindrical member 15 is slightly elongated by undercutting, but restored to the predetermined dimensions by the restoring force inherent in the resin material.

Since the thickness of the movable core having a crescent-shaped cross section corresponding to the gap 20 in the molding dies is as small as approximately 0.4 mm, for example, the movable core tends to break during molding operation, lowering molding efficiency. If the thickness of the movable core is increased to maintain the strength thereof, however, the outside diameter of the outer cylindrical member 16 also has to be increased to maintain the thickness of the side wall thereof, and accordingly the inside diameter of the retaining part 19 to be provided on the housing 1 also has to be increased. This may cause interference among the related surrounding members, making the size of the device itself larger. Thus, the ever-increasing need for making the size and thickness of the device smaller and thinner cannot be met satisfactorily.

With the conventional bearing retaining body 14, as the entire inner circumferential surface comes in contact with the outer circumferential surface of the bearing 9, the heat transmitted from a coil (not shown) constituting the armature tends to be accumulated, and hardly dissipated smoothly. This causes the heat resistance of the entire motor to deteriorate. To cope with this, the bearing retaining body 14 can be made of a resin material having high heat resistance, but dramatic improvement in the heat resistance of resin materials cannot be readily expected and a resin material having high heat resistance is usually poor in moldability.

Since the bearing retaining body 14 mentioned above has such a construction that the bearing 9 is held in place by the entire inner circumferential surface of the ring-shaped inner cylindrical member 15, it is very troublesome to adjust the force for holding the bearing 9. If the heat generated by the armature coil is transmitted to the bearing retaining body 14, as noted above, each portion thereof tends to be elongated and deformed due to thermal expansion. In addition, the deformation is not necessarily uniform. Thus, the force for holding the bearing 9 becomes uneven, adversely affecting the self-aligning function in extreme cases.

SUMMARY OF THE INVENTION

It is the first object of this invention to provide a bearing device for miniature motors which can be manufactured with molding dies having a simple construction at an improved molding efficiency.

It is the second object of this invention to provide a bearing device for miniature motors in which transmitted heat can be smoothly dissipated and heat resistance can be improved.

It is the third object of this invention to provide a bearing device for miniature motors which can hold a ball bearing at an adequate force.

DETAILED DESCRIPTION OF THE EMBODIMENTS

Figure 3:
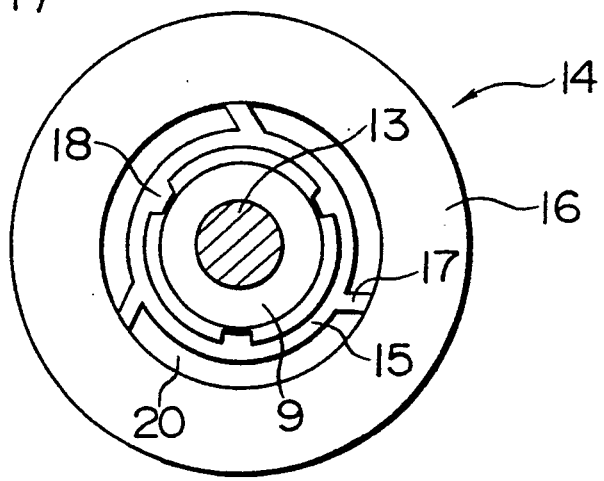
Figure 4:
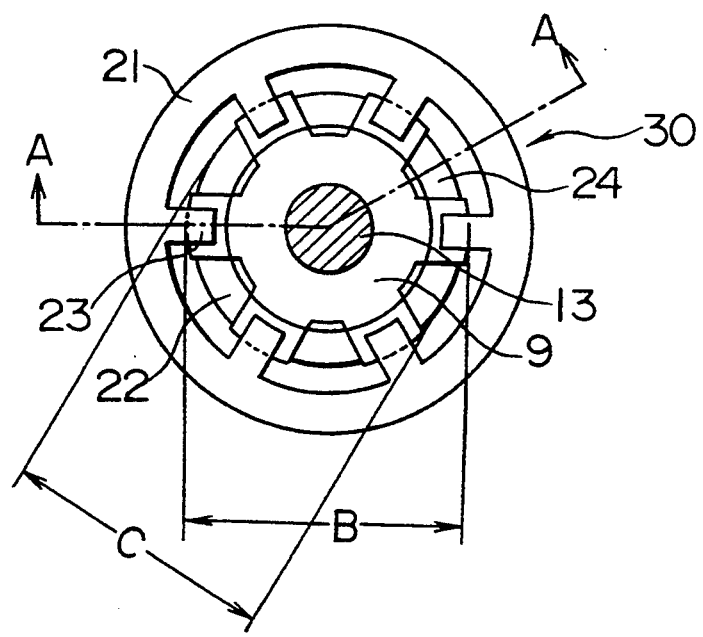
FIG. 4 is a plan view illustrating the essential part of an embodiment-of this invention.
Figure 5:
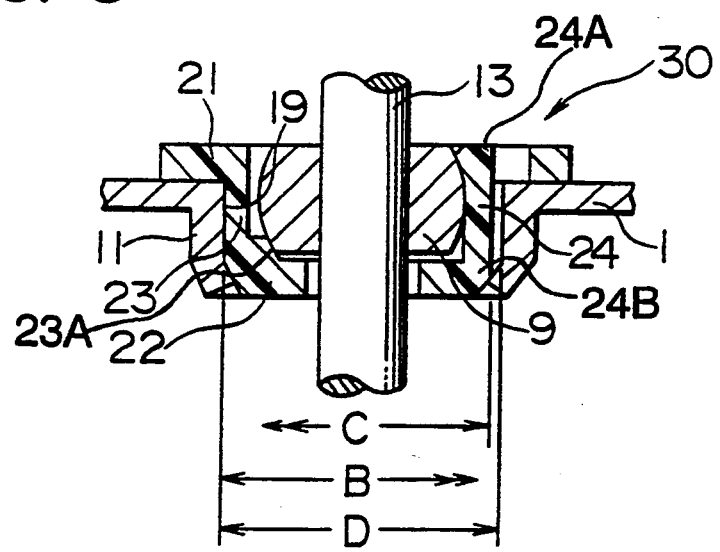
FIG. 5 is a cross-sectional view taken along line A—A in FIG. 4.
Figure 6:
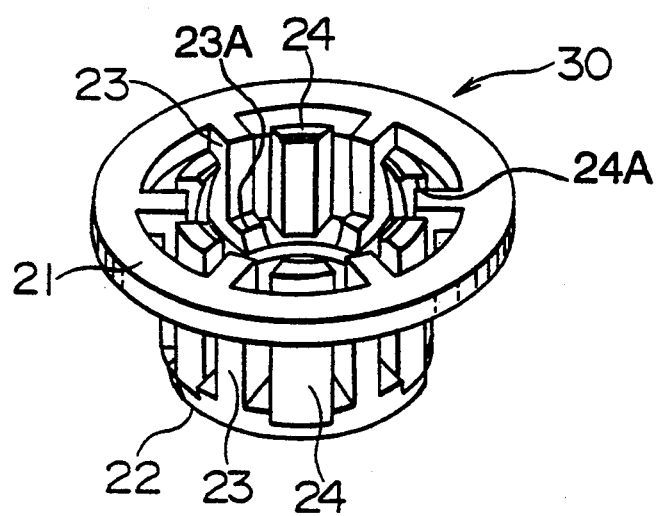
FIG. 6 is a perspective view illustrating the bearing retaining body shown in FIGS. 4 and 5.

FIG. 4 is a plan view illustrating the essential part of an embodiment of this invention. FIG. 5 is a cross-sectional view taken along line A—A shown in FIG. 4. FIG. 6 is a perspective view illustrating the bearing retaining body shown in FIGS. 4 and 5. Like parts are indicated by like numerals used in FIGS. 2 and 3. In FIGS. 4 through 6, numeral 30 refers to a bearing retaining body having a flange 21 and a bottom member 22, both formed into a ring shape, connected by a plurality of connecting members 23; a plurality of supporting columns 24 being provided on the bottom member 22 (the supporting columns 24 are connected at an axially inner edge of the bottom member 22); and the entire assembly being integrally formed by a thermoplastic resin material (polyamide resin or other resins having good heat resistance and wear resistance). That is, the connecting members 23 and the supporting columns 24 are formed in a rod shape so as to extend in the axial direction and are disposed alternately and at equal intervals in the circumferential direction. The inner circumferential surface formed by the boundary portion of the connecting members 23 and the bottom member 22, and the free ends of the supporting columns 24 is formed into essentially the same spherical surface as the outer circumferential surface of the bearing 9 so as to hold the bearing 9.

As shown in FIGS. 5 and 6, each of the connecting members 23 have a boundary portion 23a which is positioned at a boundary of each of the connecting members 23 and the bottom member 22. The boundary portion 23a has an inner circumferential surface which provides a corresponding circumferential surface to the outer circumferential surface of the bearing 9, to hold the bearing 9. Each of the supporting columns 24 have a free end 24a which is positioned on an opposite side of the bottom member 22. The free end 24a has an inner circumferential surface corresponding to the spherical surface of the outer circumferential surface of the bearing 9, to hold the bearing 9.

Each of the supporting columns 24 have a part 24b positioned on an opposite side of the free end 24a. The part 24b is provided so as to not contact the bearing 9.

With the outside diameter of the connecting members 23 being B, the outside diameter of the supporting columns 24 being C, and the inside diameter of the retaining part 19 being D, the diameters B, C and D should preferably be formed so that. $C<D<B$. The outside diameter of the flange 21 is made slightly larger than the outside diameter B of the connecting members 23. The outside diameters B and C, and the inside diameter D are often as small as less than 10 mm, or less than 3 mm in most cases, as described above, referring to FIGS. 2 and 3.

Figure 1:
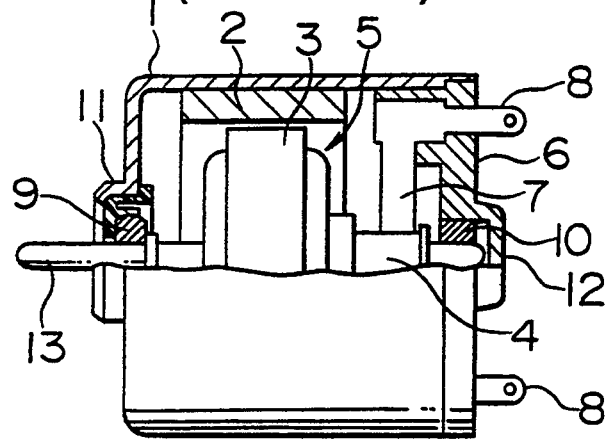
FIG. 1 is a longitudinal sectional front view illustrating an example of miniature motor to which this invention is applied.
Figure 2:
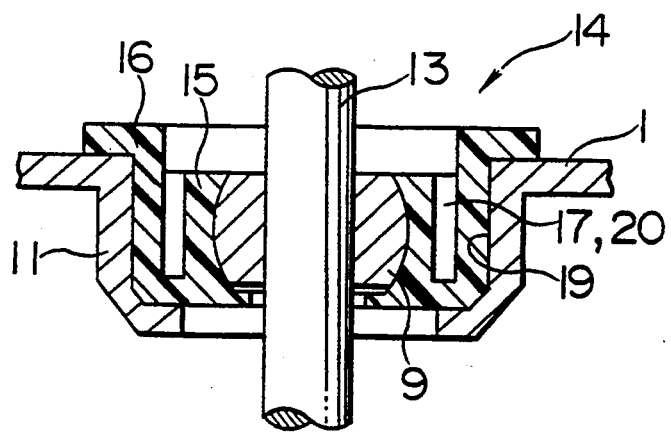
FIGS. 2 and 3 are a longitudinal sectional view and a partly cross-sectional plan view illustrating the neighborhood of the bearing retaining body shown in FIG. 1.

An effective means to form the bearing retaining body 30 having the aforementioned construction is injection molding means using molding dies. In this case, since the entire bearing retaining body 30 is formed into a basket shape, there is no need for using a thin-walled movable core to form the gap 20, as shown in FIGS. 2 and 3. Thus, the cavity for forming the bearing retaining body 30 can be formed only by combining stationary and movable dies. This results in a simplified construction of molding dies.

Next, when the bearing retaining body 30 is press-fitted into the retaining part 19 provided in the housing 1, as shown in FIG. 5, the bearing retaining body 30 is held in the same manner as shown in FIG. 2. In this case, however, only the connecting members 23 are elastically deformed, and even when the outside diameter B of the connecting members 23 is reduced to the inside diameter D of the retaining part 19, the force for retaining the bearing 9 is not adversely affected because the outside diameter C of the supporting columns 24 is smaller than the inside diameter of the retaining part 19 ($C<D$). The force for holding the bearing 9 can be individually set to an adequate value because the free ends 24A of the supporting columns 24 on the side of the flange 21 are not affected by the other supporting columns 24. Thus, the bearing holding force imparted by each of the supporting columns 24 can be kept uniform.

In this embodiment, description has been made on an example where the bearing retaining body for holding and housing the ball bearing is provided on the housing side, but it may be provided on the side of the end plate, or on both sides.

This invention having the aforementioned construction and operation can achieve the following effects.

(1) By forming the entire bearing retaining body constituting the bearing device into a basket shape, the need for using a thin-walled movable core as used in the prior art can be eliminated. This simplifies the construction of molding dies, improves the mechanical strength of die members, and substantially improves molding efficiency.

(2) By forming the bearing retaining body into a basket shape, the transmitted heat is prevented from being accumulated and can be dissipated smoothly.

This helps improve the heat resistance of the entire miniature motor, including the bearing device.

(3) Since the supporting columns holding the bearing is formed independently of the connecting members press-fitted into the retaining part, and the outside diameter of the supporting columns is made smaller than the outside diameter of the connecting members, the supporting columns are not affected by press-fit allowance for the retaining part, the force for holding the ball bearing can be kept at an appropriate level.

(4) Since this invention has such a construction that a plurality of the supporting columns holding the ball bearing are disposed in the circumferential direction, the force for holding the ball bearing can be kept uniform.

What is claimed is:

1. A bearing device for miniature motor with bearing device, comprising:
    a stator formed with a housing having an open end and having a bottomed hollow cylindrical shape with an end plate fitted to said open end;
    a rotor positioned within said housing;
    bearings connected to said rotor for supporting said rotor in said housing; and
    a bearing retaining body formed of a resin material, said bearing retaining body including a bottom member and a flange member, each of said bottom member and said flange member having a ring shape, a plurality of axially extending and circumferentially disposed connecting members, connecting said flange and said bottom member, each of said connecting members having a boundary portion positioned at a boundary between said connecting members and said bottom member, said boundary portion having an inner circumferential surface corresponding to a spherical surface of an outer circumferential surface of said bearing, for holding said bearing, and a plurality of axially extending support columns disposed in a circumferential direction on an inner edge of said bottom member, each of said support columns having a free end disposed opposite said bottom member, said free end having an inner circumferential surface corresponding to said spherical surface of said outer circumferential surface of said bearing, for holding said bearing, each of said supporting columns having a boundary part positioned at a boundary of said supporting member and said bottom member, said boundary part being spaced away from said bearing to not contact said bearing, said retaining body being connected to one of said housing and said end plate for supporting said bearing.

2. A miniature device according to claim 1, wherein said retaining body is connected to said housing via a retaining part, said connecting members defining a connecting member diameter B, said support columns defining a support column diameter C and said retaining part defining a retaining part diameter D wherein $C<D<B$.

3. A miniature device according to claim 1, wherein said support columns and said connecting members are provided alternately in a circumferential direction of said retaining body.

4. A bearing device for miniature motors including a stator formed with a housing having an open end and having a bottomed hollow cylindrical shape with an end plate fitted to said open end, a rotor positioned within said housing, and bearings connected to said rotor for supporting said rotor in said housing, the bearing device including, a bearing retaining body formed of a resin material, comprising:
    a bottom member;
    a flange member, each of said bottom member and said flange member having a ring shape;
    a plurality of axially extending and circumferentially disposed connecting members, connecting said flange and said bottom member, each of said connecting members having a boundary portion positioned at a boundary between said connecting members and said bottom member;
    a plurality of axially extending support columns disposed in a circumferential direction on an inner edge of said bottom member, each of said supporting columns having a free end disposed on each supporting column, opposite said bottom member, said free end having an inner circumferential surface corresponding to said spherical surface of said outer circumferential surface of said bearing, for holding said bearing, each of said supporting columns having a boundary part positioned at a boundary of said supporting member and said bottom member, said retaining part being connected to one of said housing and said end plate for supporting said bearing.

5. A bearing device according to claim 4, wherein said boundary part is spaced away from said bearing to not contact said bearing.

6. A bearing device according to claim 5, wherein said boundary portion has an inner circumferential surface corresponding to a spherical surface of an outer circumferential surface of said bearing, for holding said bearing.

7. A bearing device according to claim 4, wherein said retaining body is connected to said housing via a retaining part, said connecting members defining a connecting member diameter B, said support columns defining a support column diameter C and said retaining part defining a retaining part diameter D wherein $C<D<B$.

8. A bearing device according to claim 4, wherein said support columns and said connecting members are provided alternately in a circumferential direction of said retaining body.

* * * * *